July 29, 1947.  J. N. SHIMER  2,424,670
DUMP TRUCK
Filed Jan. 31, 1945
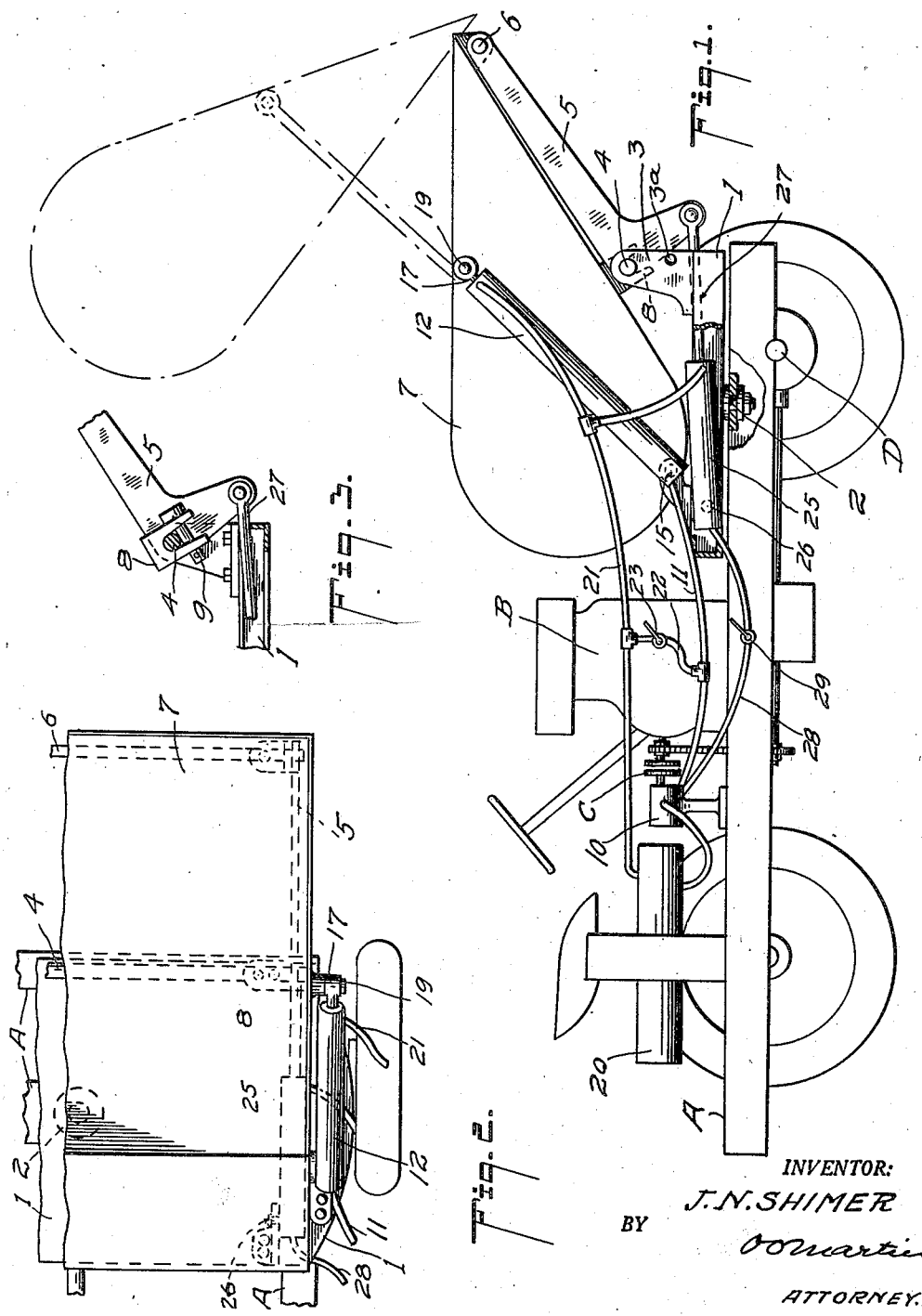
INVENTOR:
J. N. SHIMER
BY
O O Martin
ATTORNEY.

Patented July 29, 1947

2,424,670

UNITED STATES PATENT OFFICE 2,424,670

DUMP TRUCK

Joseph N. Shimer, Los Angeles, Calif.

Application January 31, 1945, Serial No. 575,460

5 Claims. (Cl. 298—22)

This invention relates to trucks and has particular reference to a light and compact dump truck operable within very limited spaces to discharge loads at various elevations.

A great variety of large trucks for carrying heavy loads have been introduced, but the average building contractor is confronted by problems which such large trucks cannot economically handle. In the construction of dwelling houses, for example, and particularly on hillsides where forms for foundation walls and the like may be substantially at ground level at some points and several feet above the ground in other places, it is of great advantage to be able not only to discharge directly into the form at high elevation but also quickly to adjust the dumping mechanism to discharge the load at any required intermediate elevation.

It is the general object of my invention to provide a device particularly adapted for such operations.

In such construction work, the space available for the operation of the dump truck is often so limited as to render turning of the vehicle impossible. In view of this, it is a further object of the invention to provide a device which is readily adjustable to discharge a load sidewise of the truck as well as endwise thereof and at any desired elevation.

The building contractor is often confronted by the problem of leveling the ground surface surrounding the foundation which he has erected and to remove or spread heaps of dirt which has been dug out in order to make room for forms. This is usually done by hand or some special machine brought in for such work. It is another object of the invention to provide a mechanism which, by simple adjustment may be converted into a device for performing such scooping and spreading operation of accumulated dirt.

With these and other objects in view, as will appear upon perusal of the description to follow, the invention resides in the combinations set forth in said description and drawings are hereto annexed in which preferred forms of the invention are illustrated.

In the drawings:

Figure 1 is a side view of a dump truck embodying the invention;

Figure 2 is a fragmentary plan view of the front right corner of the device of Figure 1; and Figure 3 is a detail view of parts of the mechanism shown in Figure 1.

The structure of the invention, in the form illustrated in the drawings, comprises a platform 1 which is pivotally secured at 2 on the chassis A of a three-wheel truck. It is noticed that brackets 3 rise from the front corners of this platform to support a transverse shaft 4. Levers 5 are mounted on this shaft at the outer ends thereof, and they are perforated at their upper ends to receive a pivot rod 6 of a dumping body or skip 7. Since the mechanism on both sides of the truck may be exactly alike, it is to be understood that the description is confined to the mechanism on the right side only and equally pertains to the other side of the truck. The larger portion of this skip rests on the platform 1 to bring the center of gravity of the body well within the front axle D of the truck. The levers 5 are normally maintained in the elevated position shown in a manner which will be understood from the following description.

The truck engine B is, through a suitable clutch C, connected to drive a pump 10 from which a flexible conduit 11 extends to the inner end of a cylinder 12, and the latter is hung on a pivot 15 of the platform to swing in a vertical plane. From a piston within this cylinder extends a rod 17, the upper end of which is hung on a pivot 19 of the skip. From this brief description, it is seen that the clutch C may be engaged to drive the pump, thereby to draw fluid from a reservoir 20 and to force this fluid into the cylinder 12 for the purpose of advancing the piston therein and in turn to swing the skip upward on the pivot 19 into the dumping position indicated in dotted outline in Figure 1. A bypass for return of the fluid to the reservoir, at the outer end of the piston stroke should be provided to relieve the pressure against the piston, and such bypass is indicated at 21, in Figure 1. When the clutch again is disengaged and the pump stops, it is found that the weight of the skip will move the piston a slight distance, merely enough to close the entrance to the bypass 21, whereupon this movement is checked by the fluid which is held confined within the piston.

In order subsequently to make it possible to return the skip to its initial position, it is necessary to interconnect the conduit 11 with the bypass 21 by means of a conduit 22, and to cut a valve 23 into this interconnection. When the valve is opened, it is seen that gravity will return the skip to its initial position.

The device of the invention, when operated as above outlined will discharge a load high above the ground, and this is a distinct advantage in certain types of work. At other times, however, it may be found more important to discharge the load closer to the ground, and this may be done in the following manner. Within the platform 1 is hung a second cylinder 25, on a pivot 26, and from a piston within this cylinder extends a normally advanced rod 27 to the lower end of the lever 5. A conduit 28 extends from the pump to this cylinder and passage therethrough is normally checked by a valve 29. Fluid has, before the valve 29 was closed, been pumped into this cylinder to advance the piston thereof, and the confined fluid now maintains the lever 5 in elevated position. When it is desired to dump at a lower level, it is merely required to open the valve 29, thereby to cause the overhanging weight of the skip to swing the lever 5 into the desired, lower dumping position, and then to close the valve. The clutch is then thrown to start the pump and the skip will rise to discharge the load from this lower position. In this manner, it is possible to dump at any desired elevation from close to the ground level to the maximum height shown in Fig. 1.

As stated, the skip is placed on the pivotally mounted platform in order to make it possible to swing the mechanism on the truck so as to discharge the load sidewise, right or left. This is essential to efficient operation of the device under conditions where insufficient room is present within which for the truck to make turns. But, where sufficient space for turning is found in the places where the truck is to be used, it is of course possible to mount the dumping mechanism directly on the chassis and so to save the extra expense of the rotating platform.

In order to readjust the device for use in leveling or spreading piles of loose dirt, it is merely required to remove the pivot rod 6 and to lock the skip 7 for rotation on the transverse shaft 4. Illustrative of means for effecting such locking, the skip 7 is shown fitted with a grooved lug 8, see also Fig. 3, which rides on said transverse shaft. A pin or bolt 9 is then seated in the outer end of the lug, thereby to lock the shaft for rotation within the bifurcation of the lug.

While I have in the foregoing step by step described the complete combination of the invention, it is to be understood that it may not always be required, in practice, to include all of the elements and features thereof. In its simplest form, the levers 5 would be rigidly combined with the brackets 3, as by seating a rod in the perforations 3ª of the brackets, so as to deliver always at the highest elevation, and the turntable would in such simple device also be omitted. But the principle of operation would, in all cases, remain unchanged. Nor do I wish to be limited to the exact combinations and arrangements of parts and features described and illustrated in the drawings, but reserve the right to embody further modifications within the scope of the claims hereto appended.

I claim:

1. In combination with a truck chassis and an engine thereon, brackets rising from the front corners of said chassis, levers pivotally hung in said brackets and normally forwardly rising therefrom, a rod interconnecting the outer ends of said levers, a skip pivotally connected at the front end thereof to the rods of said levers, cylinders pivotally mounted on said chassis, piston rods extending therefrom and pivotally secured to the upper edge of the skip intermediate its ends, a pump operable by said engine, a clutch controlling the operation of said pump, conduits from the pump to the said cylinders for fluid to advance the piston rods and to swing the skip upward on its pivotal lever connections into dumping position, means for controlling rotation of said levers on said brackets to cause the skip to swing forward and downward for dumping at a lower level and means controlling flow through said conduits.

2. In combination with a truck chassis and an engine thereon, brackets rising from the front corners of said chassis, levers pivotally mounted in said brackets and normally forwardly rising therefrom, a skip pivotally connected at the front end thereof to the upper ends of said levers, cylinders mounted on said chassis, piston rods extending from the cylinders and pivotally secured at the upper edge of the skip intermediate its ends, a pump operable from said engine, conduits from said pump to the said cylinders for passing fluid thereinto to swing the skip upward on its lever connections into dumping position, a second set of cylinders on the chassis operatively connected to the lower ends of said levers, conduits from the pump to said second cylinders, and means controlling the flow of fluid through all of said conduits to the cylinders to determine the extent of movement of said skip and the said levers.

3. In combination with a truck chassis and an engine mounted thereon, brackets rising from the front corners of said chassis, levers pivotally hung on said brackets, a dumping body or skip hung on pivots at the upper end of said levers, cylinders pivotally mounted on the chassis, piston rods extending from said cylinders to the upper edge of said skip intermediate its ends, a pump operable by said engine, conduits from said pump to carry fluid to said cylinders thereby to swing said skip on said lever pivots upward into dumping position.

4. In combination with a truck chassis and an engine mounted thereon, brackets rising from the front corners of said chassis, a shaft interconnecting the outer ends of said brackets, levers pivotally hung on said shaft, a dumping body or skip hung on pivots at the upper end of said levers, cylinders pivotally mounted on the chassis, piston rods extending from said cylinders to the upper edge of said skip intermediate its ends, a pump operable by said engine, conduits from said pump to carry fluid to said cylinders thereby to swing said skip on said lever pivots upward into dumping position.

5. In combination with a truck chassis and engine thereon, brackets rising from the front corners of said chassis, a shaft horizontally interconnecting the outer ends of said brackets, levers pivotally hung in said brackets and normally forwardly rising therefrom, a dumping body or skip pivotally connected at the front end thereof to the upper ends of said levers, guides on said skip normally riding on said shaft, cylinders pivotally mounted on the chassis, piston rods extending therefrom and pivotally secured to the upper edge of the skip intermediate its ends, a pump operable by said engine, conduits from said pump to the said cylinders for fluid to swing the skip upward on its pivotal lever connections into dumping position, and means controlling the operation of the cylinders.

JOSEPH N. SHIMER.

REFERENCES CITED

The following references are of record in the file of this patent:

UNITED STATES PATENTS

| Number | Name | Date |
|---|---|---|
| 2,034,544 | Wood | Mar. 17, 1936 |
| 1,997,000 | Lamb | Apr. 9, 1935 |
| 1,447,719 | Gasser | Mar. 6, 1923 |
| 2,174,956 | Allison | Oct. 3, 1939 |
| 1,358,675 | Schmitt | Nov. 9, 1920 |